United States Patent Office 3,547,977
Patented Dec. 15, 1970

3,547,977
NOVEL CARBANILATES
Sidney B. Richter, Chicago, Ill., assignor to Velsicol Chemical Corporation, Chicago, Ill., a corporation of Delaware
No Drawing. Filed Oct. 27, 1967, Ser. No. 678,530
Int. Cl. C07c *101/44*
U.S. Cl. 260—471
18 Claims

ABSTRACT OF THE DISCLOSURE

A compound of the formula

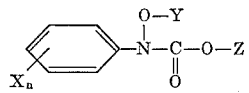

wherein $n$ is an integer of from 0 to 5; X is selected from halogen, an aliphatic radical, nitro, acyl, acyloxy, hydroxy and alkoxy; Y is selected from the group consisting of hydrogen, alkyl, phenyl and a carbamoyl radical of the formula

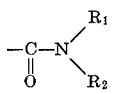

wherein $R_1$ and $R_2$ independently are selected from the group consisting of hydrogen, alkyl and phenyl; and Z is a member selected from the group consisting of an aliphatic radical, a cycloaliphatic radical, aryl and aralkyl.

---

This invention relates to new compounds and to pesticidal compositions containing such compounds as well as to methods of using such compositions to control pests.

The compounds of this invention can be represented by the following formula

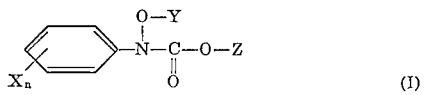

wherein $n$ is an integer from 0 to 5; X is selected from the group consisting of halogen, an aliphatic radical, nitro, acyl, acyloxy, hydroxy, and alkoxy, and when $n$ is greater than one X can be the same or different; Y is selected from the group consisting of hydrogen, alkyl, phenyl and a carbamoyl radical of the formula:

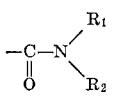

wherein $R_1$ and $R_2$ independently are selected from that group consisting of hydrogen, alkyl and phenyl; and Z is selected from the group consisting of an aliphatic radical, a cycloaliphatic radical, aryl and aralkyl. The compounds represented by the above general formula are effective as pesticides, and particularly as fungicides, nematocides, miticides, insecticides and herbicides.

The compounds of this invention can be prepared by one or more general reactive steps depending upon the particular compounds desired. When compounds are desired where Y of Formula I is hydrogen, then an N-phenyl hydroxylamine of the formula:

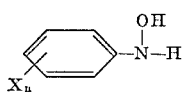

can be reacted with an ester of chloroformic acid of the formula:

wherein X, $n$ and Z have the same significance as for Formula I above. For example, X can be halo such as chloro, bromo, iodo or fluoro; aliphatic, such as alkyl of from 1 to about 5 carbon atoms or alkenyl of from 2 to about 5 carbon atoms; nitro; acyl or acyloxy such as saturated or unsaturated acyl or acyloxy containing from 1 to about 5 carbon atoms; hydroxy; or alkoxy such as alkoxy containing from 1 to about 5 carbon atoms; and Z can be aliphatic such as alkyl of from 1 to about 5 carbon atoms, alkenyl or alkynyl of from 2 to about 5 carbon atoms; cycloaliphatic such as cycloalkyl or cycloalkenyl of from 5 to about 7 carbon atoms; aryl such as phenyl or naphthyl; or aralkyl such as phenyl substituted alkyl where the alkyl group contains from 1 to about 5 carbon atoms. When compounds represented by Formula I are desired having Y other than hydrogen, then an N-hydroxy-carbamate, prepared as above, can be further reacted to form the compounds with the desired Y substituent. For example, when compounds of Formula I are desired where Y is a carbamoyl radical of the formula:

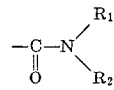

wherein $R_1$ and $R_2$ are independently selected from the group consisting of hydrogen, phenyl or an alkyl group of from 1 to about 5 carbon atoms, then the corresponding N-hydroxy-carbamate can be reacted with a suitable isocyanate or carbamoyl chloride. When compounds are desired where Y is phenyl or an alkyl group of from 1 to about 5 carbon atoms then a corresponding N-hydroxy-carbamate can be alkylated with an appropriate alkylating agent containing the desired Y substituent.

The substituents X, Y and Z of Formula I, which are illustrated above, can also be substituted, where possible, with such groups as halogen, hydroxy, alkoxy, acyl, acyloxy, nitro or combinations thereof. For example, X can be haloalkyl, such as chloromethyl, trifluoromethyl; hydroxyalkyl, such as 3-hydroxypropyl; nitroalkyl, such as 2-nitroethyl; haloacyl, such as trichloroacetyl; Y can be haloalkyl, nitroalkyl, halophenyl, such as 4-chlorophenyl and the $R_1$ and $R_2$ of the carbamoyl group can be haloalkyl or halophenyl; and Z can be haloalkyl; nitroalkyl; haloalkenyl; haloalkynyl; haloaralkyl; such as 4-chlorobenzyl; nitroaralkyl such as 4-nitrobenzyl; halophenyl such as 4-chlorophenyl; hydroxyphenyl such as 3-hydroxyphenyl or alkoxyphenyl such as 4-methoxyphenyl.

Examples of suitable N-phenyl-hydroxylamines of Formula II which can be reacted with the ester of chloroformic acid of Formula III to prepare the compounds of Formula I where Y is hydrogen include: N - 4 - chlorophenyl-hydroxylamine, N - 3 - chlorophenyl-hydroxylamine, N - 3,4 - dichlorophenyl-hydroxylamine, N-2,4,6-trichlorophenyl-hydroxylamine, N - 4 - bromophenyl-hydroxylamine, N - 4 - methylphenyl-hydroxylamine, N-3-methylphenyl-hydroxylamine, N - 4 - ethylphenyl-hydroxylamine, N-3,4-dimethylphenyl-hydroxylamine, N-4-chloromethylphenyl-hydroxylamine, N-4-trifluoromethylphenyl-hydroxylamine, N - 4 - hydroxymethylphenyl-hydroxylamine, N - 3 - nitrophenyl-hydroxylamine, N - 4 - nitrophenyl-hydroxylamine, N - 4 - acetylphenyl-hydroxylamine, N - 4 - trichloroacetylphenyl-hydroxylamine, N-3-formyloxyphenyl-hydroxylamine, N - 4 - acetyloxyphenyl-hydroxylamine, N-4-hydroxyphenyl-hydroxylamine, N-3-hydroxyphenyl-hydroxylamine, N - 3 - methoxyphenyl-hydroxylamine, N - 4 - ethoxyphenyl-hydroxylamine, N-3- chloro-4-methylphenyl-hydroxylamine, or N - 3 - chloro-4-nitrophenyl-hydroxylamine.

Examples of suitable esters of chloroformic acid represented by Formula III which can be reacted with the above illustrated N - phenyl - hydroxylamines include: ethyl chloroformate, 3 - chloropropyl chloroformate, 4-chlorobutyl chloroformate, vinyl chloroformate, propen-2-yl-1 chloroformate, 4-chlorobuten - 3 - yl - 1 chloroformate, propyn - 2 - yl - 1 chloroformate, butyn-2-yl-1 chloroformate, 2 - chlorobutyn - 3 - yl - 1 chloroformate, cyclopentyl chloroformate, cyclohexyl chloroformate, cyclohexen-3-yl chloroformate, phenyl chloroformate, 4-chlorophenyl chloroformate, benzyl chloroformate, or 4-chlorobenzyl chloroformate.

In effecting the preparational reaction of the N-phenyl hydroxylamine of Formula II with the ester of chloroformic acid of Formula III the conditions and procedures used can be widely varied. Typically, the reaction can be effected by simply reacting the chloroformate with the desired N-phenyl hydroxylamine preferably in the presence of a suitable inert solvent such as dioxane or quinoline and an acid acceptor such as an alkali metal carbonate or bicarbonate such as sodium bicarbonate. In conducting the reaction it is generally preferable to slowly add the chloroformate to a mixture of the N-phenyl hydroxylamine, solvent and acid acceptor maintained at a low temperature of about −10° to 5° C. The ratio of the reactants is not usually important and a stoichiometric quantity of the chloroformate and the N-phenyl hydroxylamine can be suitably used. When the reaction is complete, the desired product can be recovered and purified by conventional techniques including filtration and recrystallization. As indicated, when carbamates of Formula I are desired where Y is other than hydrogen, then the N-hydroxy carbamate prepared as above can be further reacted to obtain the desired Y substituted carbamate. When reacting the N-hydroxycarbamate with a suitable isocyanate or carbamoyl chloride or O-alkylating with an appropriate alkylating agent, the conditions and procedures can be widely varied. Typically, however, those conditions and procedures which are commonly used for such reactions can be employed. Examples of the compounds of this invention represented by Formula I, which can be thus prepared include: propyl N - 4 - chlorophenyl - N - hydroxy-carbamate, 4 - chlorobutyl - 1, N - 3′ - methylphenyl-N-hydroxy-carbamate, propen-2-yl-1 N - 4′ - chloro-3′-methoxyphenyl-N-hydroxy-carbamate, cyclopentyl N-phenyl-N-hydroxycarbamate, phenyl N - 4′ - acetylphenyl-N-hydroxy-carbamate, 4 - chlorophenyl N - 3′,4′ - dichlorophenyl-N-hydroxy-carbamate, benzyl N - 4′ - methoxyphenyl-N-hydroxy-carbamate, 4 - methoxyphenyl N - 3′-nitrophenyl-N-hydroxy-carbamate, butyn-3-yl-1 N - 3′,4′-dimethylphenyl-N-methoxy-carbamate, ethyl N-4′-chlorophenyl-N-methoxy-carbamate, benzyl N-4′-trifluormethylphenyl-N-ethoxy-carbamate, isopropyl N - 4 - formyloxyphenyl-N-carbamoyloxy-carbamate, butyn-3-yl-1 N-3′,4′-dichlorophenyl-N-carbamoyloxy-carbamate, ethyl N - 3-methyl - 4 - chlorophenyl - N-(N′,-N′-dimethylcarbamoyloxy)-carbamate, or isopropyl N-4-chlorophenyl-N-(N′-4-chlorophenylcarbamoyloxy)-carbamate.

The preparation of the compounds of this invention can be illustrated by the following examples:

EXAMPLE 1

Ethyl N-3,4-dichlorophenyl-N-hydroxy-carbamate was prepared by charging 9 grams (0.05 mol) of N-3,4-dichlorophenyl-hydroxylamine, 6 grams of potassium carbonate, 45 ml. of dioxane and 10 ml. of water to a reaction flask. With stirring, 5.3 grams (0.049 mol) of ethyl chloroformate were slowly added over a period of about 20 minutes with the temperature maintained at about 0° to 5° C. After stirring for about ½ hour, the reaction mixture was combined with ice water and stirred for about 15 minutes more. The solids which formed were recovered, dissolved in ethyl ether and the resultant solution was dried. After removing the ethyl ether, the residue was recrystallized twice from hexane to yield 2.5 grams of a yellow, crystalline product having a melting point of 71° to 72° C. Analysis for $C_9H_9Cl_2NO_3$:

Theoretical (percent): C, 43.23; H, 3.63; N, 5.60.
Found (percent): C, 43.55; H, 3.83; N, 5.50.

EXAMPLE 2

Ethyl N-4-chlorophenyl-N-hydroxy-carbamate was prepared by charging 20 grams (0.139 mol) of N-4-chlorophenyl-hydroxylamine, 14 grams of sodium bicarbonate, 80 ml. of dioxane and 20 ml. of water to a reaction flask. With stirring, 17.1 grams (0.158 mol) of ethyl chloroformate were slowly added over a period of about 20 minutes with the temperature maintained at about 0° to 5° C. After stirring for about ½ hour, the reaction mixture was combined with ice water and stirred for about 15 minutes more. The solids which formed were recovered, dissolved in ethyl ether and the resultant solution was dried. After removing the ethyl ether, the residue was recrystallized twice from hexane to yield 16.8 grams of a tan, crystalline product having a melting point of 78° to 79° C. Analysis for $C_9H_{10}ClNO_3$:

Theoretical (percent): C, 50.26; H, 4.68; Cl, 16.47.
Found (percent): C, 50,25; H, 4.83; Cl, 16.41.

EXAMPLE 3

Ethyl N-3 - chloro - 4 - methylphenyl-N-hydroxy-carbamate was prepared by charging 10 grams (0.064 mol) of N-3-chloro-4-methylphenyl-hydroxylamine, 6 grams of sodium bicarbonate, 40 ml. of dioxane and 19 ml. of water to a reaction flask. With stirring, 6.9 grams (0.064 mol) of ethyl chloroformate were slowly added over a period of about 28 minutes with the temperature maintained at about 0° to 5° C. After stirring for about ½ hour, the reaction mixture was combined with ice water and stirred for about 15 minutes more. The solids which formed were recovered, dissolved in ethyl ether and the resultant solution was dried. After removing the ethyl ether, the residue was recrystallized twice from hexane to yield 10.8 grams of a pale yellow, crystalline product having a melting point of 86° to 87° C. Analysis for $C_{10}H_{12}ClNO_3$:

Theoretical (percent): C, 52.29; H, 5.27; Cl, 15.45.
Found (percent): C, 52.42; H, 5.38; Cl, 15.33.

EXAMPLE 4

Ethyl N-3-nitrophenyl-N-hydroxy-carbamate was prepared by charging 19 grams (0.103 mol) of N-3-nitrophenyl-hydroxylamine, 11 grams of sodium bicarbonate, 100 ml. of dioxane and 25 ml. of water to a reaction flask. With stirring, 13.3 grams (0.12 mol) of ethyl chloroformate were slowly added over a period of about 20 minutes with the temperature maintained at about 0° to 5° C. After stirring for about ½ hour, the reaction mixture was combined with ice water and stirred for about 15 minutes more. The solids which formed were recovered, dried, and recrystallized twice from a benzene-hexane mixture to yield 15.5 grams of a yellow, crystalline product having a melting point of 103° to 105° C. Analysis for $C_9H_{10}N_2O_5$:

Theoretical (percent): C, 47.76; H, 4.45; N, 12.38.
Found (percent): C, 47.81; H, 4.88; N, 12.71.

EXAMPLE 5

Ethyl N-3,4-dimethylphenyl-N-hydroxy-carbamate was prepared by charging 12 grams (0.087 mol) of N-3,4-dimethylphenyl-hydroxylamine, 8 grams of sodium bicarbonate, 40 ml. of dioxane and 10 ml. of water to a reaction flask. With stirring, 9.5 grams (0.087 mol) of ethyl chloroformate were slowly added over a period of about 20 minutes with the temperature maintained at about 0° to 5° C. After stirring for about ½ hour, the reaction mixture was combined with ice water and stirred for about 15 minutes more. The solids which formed were recovered, dissolved in ethyl ether and the resultant solution was dried. After removing the ethyl ether, the residue was recrystallized twice from hexane to yield a pale yellow, crystalline product having a melting point of 51° to 53° C. Analysis for $C_{11}H_{15}NO_3$:

Theoretical (percent): C, 63.13; H, 7.23; N, 6.70. Found (percent): C, 63.03; H, 7.47; N, 6.69.

EXAMPLE 6

Benzyl N-4-chlorophenyl-N-hydroxy-carbamate was prepared by charging 28.7 grams (0.2 mol) of N-4-chlorophenyl-hydroxylamine, 25 grams (0.3 mol) of sodium bicarbonate, 200 ml. of dioxane and 40 ml. of water to a reaction flask. With stirring, 34 grams (0.2 mol) of benzyl chloroformate were slowly added over a period of about 20 minutes with the temperature maintained at about 0° to 5° C. After stirring for about ½ hour, the reaction mixture was combined with ice water and stirred for about 15 minutes more. The solids which formed were recovered, dissolved in ethyl ether and the resultant solution was dried. After removing the ethyl ether, the residue was recrystallized twice from methanol to yield 48 grams of tan, crystalline product.

EXAMPLE 7

Ethyl N-2,6-dimethylphenyl-N-hydroxy-carbamate was prepared by charging 10 grams (0.0725 mol) of N-2,6-dimethylphenyl-hydroxylamine, 9 grams of sodium bicarbonate, 80 ml. of dioxane and 20 ml. of water to a reaction flask. With stirring, 7.9 grams (0.073 mol) of ethyl chloroformate were slowly added over a period of about 20 minutes with the temperature maintained at about 0° to 5° C. After stirring for about 1 hour, the reaction mixture was combined with ice water and stirred for about 15 minutes more. The solids which formed were recovered, dried and recrystallized twice from hexane to yield 8.2 grams of a tan, crystalline product having a melting point of 100° to 101° C. Analysis for $C_{11}H_{15}NO_3$:

Theoretical (percent): C, 63.13; H, 7.23; N, 6.70. Found (percent): C, 62.99; H, 7.38; N, 6.53.

EXAMPLE 8

Ethyl N-3-nitrophenyl-N-carbamoyloxy-carbamate was prepared by charging 5 grams of ethyl N-3-nitrophenyl-N-hydroxy-carbamate dissolved in acetone (as prepared in Example 4) to a reaction flask. With the temperature maintained at about −10° C., 81 grams of potassium isocyanate were added followed by about 36 ml. of concentrated hydrochloric acid. The reaction mixture was stirred and the temperature allowed to rise to about 25° C. About 35 ml. of water were then added and the stirring continued for about one hour more. The acetone was removed under vacuum leaving a residue which was recrystallized from an ethyl acetate-hexane mixture to yield 1.6 grams of a yellow, crystalline product having a melting point of 116° to 118° C. Analysis for $C_{10}H_{11}N_3O_6$:

Theoretical (percent): C, 44.62; H, 4.13; N, 15.60. Found (percent): C, 44.57; H, 4.60; N, 15.53.

EXAMPLE 9

Benzyl N - 4-chlorophenyl-N-methoxy-carbamate was prepared by charging 15 grams (0.054 mol) of benzyl N-4-chlorophenyl-N-hydroxy-carbamate (prepared as in Example 6), 100 ml. of dioxane, 25 ml. of water and 7.5 grams (0.075 mol) of sodium carbonate to a reaction flask. With the temperature maintained at about 40° C., 6.6 ml. (0.07 mol) of dimethyl sulfate were added. The mixture was stirred for about one hour and then was combined with water. The resulting solids were recovered and recrystallized from methyl alcohol to yield 7.1 grams of a crystalline product having a melting point of 63° to 64° C. Analysis for $C_{15}H_{14}ClNO_3$:

Theoretical (percent): C, 61.83; H, 4.84; N, 12.84. Found (percent): C, 61.54; H, 4.96; N, 12.12.

As indicated, the compounds of this invention are useful as pesticides and particularly as fungicides, insecticides, nematocides as well as herbicides and miticides. As used herein the term pesticide includes fungicide, nematocide, insecticide, herbicide and miticide.

For practical use as pesticides, the compounds of this invention are generally incorporated into pesticidal compositions which comprise an inert carrier and a pesticidally toxic amount of the compounds. Such pesticidal compositions, which can also be called formulations, enable the active compound to be applied conveniently, in any desired quantity, to the site of the pest infestation, such as fungus, insect, nematode or mite infestation or to the site of undesired vegetation. These compositions can be solids such as dusts, granules, or wettable powders, or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases, the compounds are sufficiently soluble in common organic solvents such as kerosene or xylene so that they can be used directly dissolved in such solvents. Frequently, these solutions can be dispersed under superatmospheric pressure as aerosols. However, preferred liquid pesticidal compositions are emulsifiable concentrates, which comprise one or more compound according to this invention and as the inert carrier, a solvent and an emulsifier. Such emulsifiable concentrates can be extended with water and/or oil to any desired concentration of the compound for application as sprays to the site of the pest infestation or to the site of the undesired vegetation. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 10

Preparation of a dust

Product of example _____ 1
Powdered talc _____ 90

The above ingredients are mixed in a mechanical grinder-blender and are ground until a homogenous, freeflowing dust of the desired particle size is obtained. This dust is suitable for direct application to the site of the pest infestation or the unwanted vegetation.

The compounds of this invention can be applied as pesticides in any manner recognized by the art. One method for destroying pests or undesired vegetation comprises applying to the locus of the pest infestation or the undesired vegetation a pesticidal composition comprising an inert carrier and as the essential active ingredient, in a quantity which is toxic to said pests or to such vegetation at least one compound of this invention. The concentration of the compounds of this invention individually or in admixture in the pesticidal compositions will vary greatly depending on the type of formulation and the purpose for which it is designed, but generally the compositions will contain from about 0.05 to about 95 percent by weight of the compounds of this invention. In a preferred embodiment of this invention, the pesticidal compositions will contain from about 5 to 75 percent by weight of the compound. The compositions can also contain addition- al substances such as other pesticides, stabilizers, spreaders, deactivators, adhesives, stickers, fertilizers, or activators.

When the compounds of this invention are used as insecticides they can be employed in several different ways. When used as stomach poisons or protective materials they can be applied to the surface on which the insects feed or travel. The compounds which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the housefly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites can be controlled by the compounds of this present invention such as the red spider mite, the two spotted mite, the strawberry spider mite, the citrus rust mite, the cattle tick, the poultry mite, the citrus red mite and the European red mite. Chemicals useful for the control of mites are called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists believe that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than aboveground parts, but infection of stems, leaves, and flower parts is also fairly common.

Damage to plants attacked by nematodes is due primarily to the feeding of the nematodes on the plant tissues. The nematodes may enter the plant to feed, may feed from the outside, or be only partially embedded. The feeding of a nematode may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifested as rotting of the attacked parts and adjacent tissue or the development of galls and other abnormal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal composition of this invention can be applied to the soil, or in some cases to the plants and soil, in any convenient manner. While broadcast applications to the soil before planting by conventional plow or disc methods are effective, specialized methods such as row placement application, split-dosage applications, post-planting sidedress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made.

When the compounds of this invention are used as herbicides, they may be used to destroy undesired vegetation usually referred to as weeds. Weeds, frequently classified as broadleaf or grassy weeds, are undesirable plants which grow where they are not wanted, have no economic value, interfere with the production of cultivated crops, and the growing of ornamental plants, or with the welfare of livestock. Many types of weeds are known, including annuals such as pigweed, lambsquarters, foxtail, crabgrass, wild mustard, field pennycress, ryegrass, goosegrass, chick-weed, wild oats, velvet leaf, purslane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle; or perennials such as white cockle, perennial ryegrass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

The new compounds of this invention are particularly valuable for weed control because they are toxic to many species and groups of weeds while they are relatively non-toxic to many beneficial plants. The exact amount of compound required for herbicides will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The compounds of this invention can be combined with different fungicides, miticides, nematocides, insecticides or herbicides or combinations thereof to form either synergistic pesticide compositions or pesticide compositions capable of more than one pesticidal activity such as a pesticidal composition having both fungicidal and miticidal activity. For example, the compounds may be combined with insecticides such as halogenated compounds for example, DDT, methoxychlor, TDE, lindane, chlordane, isobenzan, aldrin, dieldrin, heptachlor, endrin, mirex, endosulfon, dicofol, and the like; organic phosphorus compounds, for example, TEPP, schradan, ethion, parathion, methyl parathion, EPN, demeton, carbonphenothion, phorate, zinophos, diazinon, malathion, mevinphos, dimethoate, DBD, ronnel, oxydemeton-methyl, dicapthon, chlorothion, phosphamidon, naled, fenthion, trichlorofon, or DDVP; organic nitrogen compounds, for example, dinitro-o-cresol, dinitrocyclohexylphenol, DNB, DNP, binapacril, azobenzene, and the like; organic carbamate compounds, for example, carbaryl or ortho 5353, organic sulfur compounds for example, phenothiazine, phenoxathin, lauryl thiocyanate, [bis (2-thiocyanoethyl) ether] or isobornyl thiocyanoacetate; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide or paradichlorobenzene, with fungicides such as ferbam, nabam, zineb, ziram, thiram, chloranil, dichlone, glyodin, cycloheximide, dmocap, maneb, captan, dodine, PCNB, or p-dimethylaminobenzenediazo sodium sulfonate; with nematocides such as chloropicrin, O,O-diethyl O-(2,4-dichlorophenyl) phosphorothioate, tetrachlorothiophene, dazomet, or dibromochloropropane, with miticides such as O,O-diisopropyl S-(isopropylthiomethyl) phosphorodithioate, O,O-diisopropyl S-diethyldithiocarbamoyl phosphorodithioate, dimefo, or dimethoate and with herbicides, defoliants, dessicants or growth inhibitors such as chlorophenoxy herbicides for example, 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides for example IPC, CIPC, swep, barban, BCPC, CEPC, or CPPC, thiocarbamate and dithiocarbamate herbicides for example CDEC, metham sodium, EPTC, diallate, PEBC, perbulate, or vernolate; substituted urea herbicides for example, norea, siduron, dichloral urea, chloroxuron, cycluron, fenuron, monuron, monuron TCA, diuron, linuron, monlinuron, neburon, buturon, or trimeturon; symmetrical triazine herbicides for example, simazine, chlorazine, atratone, desmetryne, norazine, ipazine, prometryn, strazine, trietazine, simetone, prometone, propazine, or ametryne; chloroacetamide herbicides for example, alpha-chloro - N,N - dimethylacetamide, CDEA, CDAA, alpha-chloro-N-isopropylacetamide, 2-chloro-N-isopropylacetanilide, 4-(chloroacetyl) morpholine, or 1-(chloroacetyl) piperidine; chlorinated aliphatic acid herbicides for example TCA, dalapon, 2,3-dichloropropionic acid, or 2,2,3-TPA, chlorinated benzoic acid and phenylacetic acid herbicides for example, 2,3,6-TBA, 2,3,5,6-TBA, dicamba, tricamba, amiben, fenac, PBA, 2-methoxy-3,6-dichlorophenylacetic acid, 3-methoxy-2,6-dichlorophenylacetic acid, 2 - methoxy-3,5,6-trichlorophenylacetic acid, or 2,5-dichloro-3-aminobenzoic acid; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil; DPA, diphenamid, dipropalin, trifluralin, solan, dicryl, merphos, DMPA, o-S-dimethyl tetrachlorothioterephthalate, methyl 2,3,5,6-tetrachloro-N-methoxy-N-methyl - terephthalamate, 2[(4-chloro-o-tolyl) - oxy] - N - methoxyacetamide, DSMA, MSMA, potassium azide, acrolein, benefin, bensulide, AMS, bromacil, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, bromi-nil, CP–50144, H–176–1, H–632, M–2901, planavin, sodium tetraborate, calcium cyanamid, DEF, ethyl, xanthogen disulfide, sindone, sindoneB, or propanil.

The pesticidal activity of the compounds of this invention may be illustrated by the following examples.

EXAMPLE 11

The fungicidal activity of the compounds of this invention can be demonstrated by the following.

An emulsifiable concentration containing the test compound at a rate of 25 mg. per ml. was prepared by dissolving the compound in a suitable solvent such as acetone containing a surface active agent (polyoxyalkylene derivatives of sorbitan monolaurate and/or monooleate, 2.48 mg. per 80 ml. of acetone).

Benzyl N-4-chlorophenyl-N-methoxy-carbamate was used to control the fungus (*Rhizoctonia solani*) by first preparing an aqueous fungicidal composition by admixing 1 ml. of the above emulsifiable concentrate with 77 ml. of water. Two series of soil samples were prepared by placing about 100 ml. of soil into paper cups. In each series the soil had been inoculated with a fungus obtained from a culture range in age of about 10 to 14 days. In one series, the soil samples were treated by drenching the soil in the cups with 36 ml. of the fungicidal composition equivalent to an application rate of 100 pounds of the compound per one acre having a depth of 4 inches. The other series of the soil samples were not so treated and were used as comparative samples. All of the cups were then sealed and stored under conditions favorable to fungus growth for a period ranging from about 2 to 4 days. At the end of the period, the cups were opened and the growth on the surface of the soil was observed. The growth on the treated samples was rated in comparison to that of the untreated samples on a percentage basis of the ability of the test compound to control or retard fungus growth. It was observed that the test compound had a control of 43.3%.

Two compounds were used to control the fungus *Puccinia rubigo-vera* (leaf rust of wheat) by first preparing an aqueous fungicidal spray composition by admixing the above prepared emulsifiable concentrate with sufficient water to provide the desired concentration of the test compound. A series of six day old Henry wheat plants were treated with the compounds by spraying the composition for a period of about 30 seconds at a spray pressure of 80 pounds per square inch. Another series of plants were not so treated and were used for comparative purposes. After the treated plants had dried, both the treated and untreated plants were inoculated with a 9 to 13 day old culture of the fungus. The plants were then stored under conditions favorable to fungus growth for a period of 8 days. At the end of the period, the plants were examined to determine the extent of fungus growth. The extent of the fungus growth in the treated plants was compared to that of the untreated plants and was rated on a percentage basis of the ability of the compounds to retard fungus growth. The results of the test are as follows:

| Test compound | Conc. test compound, p.p.m. by weight | Percent control |
|---|---|---|
| Ethyl N-3-nitrophenyl-N-carbamoyloxy-carbamate | 1,000 | 61.7 |
| Ethyl N-3-nitrophenyl-N-hydroxy-carbamate | 1,000 | 30.0 |

Ethyl N-3-nitrophenyl-N-hydroxy-carbamate was used to control the fungus *Collectotrichum obiculare*, which causes cucumber anthracnose, by first preparing an aqueous fungicidal composition by admixing the above emulsifiable concentrate with sufficient water to provide a concentration of 1000 p.p.m. by weight of the test compound. A series of young cucumber plants ranging in age of from 10–12 days were treated with the compound by applying the fungicidal composition as a spray for a period of 30 seconds at a pressure of 80 pounds per square inch. Another series of plants were not treated and were used for comparison purposes. After the treated plants had dried, both series of plants were inoculated by wetting the plants with an aqueous suspension containing spores from a 10–14 day old culture of the fungus. The plants were then placed in a moist chamber maintained at 20° C. for 40–42 hours after which they were placed on a greenhouse bench. Seven to ten days after inoculation the plants were examined to determine the extent of the fungus growth. The extent of the growth of the treated plants was rated on a percentage basis in comparison to the extent of the growth on the untreated plants. It was observed that the test compound had a 91% control.

EXAMPLE 12

The miticidal activity of compounds of this invention can be illustrated by the following:

Benzyl N-4 - chlorophenyl-N-methoxy-carbamate was used to control two spotted spider mites [*Tetranychus urticea* (Koch)]. A miticidal composition was prepared by mixing the emulsifiable concentrate as prepared in Example 11 with a quantity of water sufficient to provide a concentration of 3500 p.p.m. of the test compound. A series of 5 day old Henderson bush lima bean plants were treated with the compound by watering with about 39 ml. of the miticidal composition. Another series of the plants were not so treated and were used for comparative purposes. After drying for about 48 hours, both series of plants were infested with the mites by contacting the plants with leaves cut from infested plants. The plants were then stored under conditions favorable to mite growth for a period of about 5 days. After this period, the plants were examined for the presence of mites. The extent of the mite development in the treated plants was rated on a percentage basis in comparison to the development in the untreated plants. It was observed that in the treated plants there was 43% control. It was also observed that there was no injury or phytocidal effect to the plants as a result of the treatment.

EXAMPLE 13

The insecticidal activity of the compounds of this invention can be illustrated by the following:

Benzyl N-4 - chlorophenyl-N-methoxy-carbamate was used to control southern armyworms [*Prodenia eridania* (Cram.)] by first preparing an insecticidal composition by admixing the emulsifiable concentrate as prepared in Example 11 with sufficient water to provide a concentration of 3500 p.p.m. by weight of the test compound. Lima bean leaves were sprayed with the insecticidal composition and were offered to larvae (third instar stage) for a feeding period of 48 hours. It was observed that the mortality rate of the larvae after this period was 80%.

EXAMPLE 14

The nematocidal activity of the compounds of this invention can be illustrated by the following:

Ethyl N-3,4-dimethylphenyl-N-hydroxy-carbamate was used to control rootknot nematodes. A sample of inoculated soil was prepared by mixing one part of sand, four parts of sterilized soil and three parts of soil from a four month old rootknot nematode culture (Meloidogyne spp.). A portion of the soil sample was treated by mixing the soil with an amount of the emulsifiable concentrate as prepared in Example 11 sufficient to provide the soil with the desired concentration of the compound. Another portion of the soil was not so treated and was used for comparative purposes. The treated soil as well as the untreated soil was placed into a series of plastic bags contained in glass mason jaws. The jars were sealed and stored at 70° F. for a period of about 7 days. At the end of this period, the soil was transferred to plastic pots and tomato seedlings (Bonny Best) were planted in the soil. After 20 days, the soil was washed from the tomato plants and the number of rootknot nematode galls on the plants were counted. The degree of the nematode control of the test compound was evaluated on a percentage basis in comparison to the degree of galling in the untreated plants. The results of the tests are as follows:

Concentration of test compound
pounds per 4-inch acre:           Percent control
   100 _____ 95.5
    40 _____ 87.3
    16 _____ 59.0

EXAMPLE 15

The herbicidal activity of the compounds of this invention can be illustrated by the following:

Ethyl N-2,3-dimethylphenyl-N-hydroxy-carbamate was used in the pre-emergence control of crabgrass and foxtail. A herbicidal composition was prepared by admixing the emulsifiable concentrate as prepared in Example 11 with water. Small plastic pots filled with dry soil were seeded with crabgrass and foxtail plants. About 24 hours after seeding, the pots were sprayed with water until the soil was wet. The soil was then treated with the herbicidal composition by spraying the soil to provide two application rates of the test compound equivalent to 2 and 8 pounds per one acre of 4 inches in depth, respectively. After spraying, the pots were placed in a greenhouse under conditions favorable to growth. After a period of 15 to 21 days, the herbicide effect of the compound on the plants was evident at both levels of application.

Ethyl N-3,4 - dichlorophenyl-N-hydroxy-carbamate was used in the post-emergence control of chickweed. A herbicide composition prepared as above was sprayed on the foliage of chickweed plants to provide two application rates equivalent to 2 and 8 pounds of the test compound per one acre of 4 inches in depth, respectively. After spraying, the plants were placed in a greenhouse under conditions favorable to growth. After 10 to 15 days, the herbicide effect of the compound on the plants was evident at both levels of application.

I claim:
1. A compound of the formula

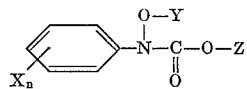

wherein n is an integer of from 0 to 5; X is selected from the group consisting of halogen, alkyl of from 1 to about 5 carbon atoms; alkenyl of from 2 to about 5 carbon atoms, nitro, acetyl, acetyloxy, hydroxy and alkoxy of from 1 to about 5 carbon atoms; Y is selected from the group consisting of hydrogen, alkyl of from 1 to about 5 carbon atoms, phenyl and a carbamoyl radical of the formula:

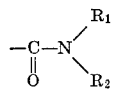

wherein $R_1$ and $R_2$ independently are selected from the group consisting of hydrogen, alkyl of from 1 to about 5 carbon atoms, and phenyl; and Z is a member selected from the group consisting of an alkyl of from 1 to about 5 carbon atoms, alkenyl and alkynyl of 2 to about 5 carbon atoms, cycloalkyl and cycloalkenyl of from 5 to about 7 carbon atoms, phenyl and naphthyl, and phenyl substituted alkyl where the alkyl group contains from 1 to about 5 carbon atoms.

2. The compound of claim 1 wherein Y is hydrogen.
3. The compound of claim 1 wherein Y is methyl.
4. The compound of claim 1 wherein Y is a carbamoyl radical of the formula:

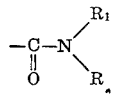

wherein $R_1$ and $R_2$ independently are selected from the group consisting of hydrogen, phenyl and an alkyl group of from 1 to 5 carbon atoms.

5. The compound of claim 1 wherein Z is an aliphatic radical selected from the group consisting of alkyl of from 1 to about 5 carbon atoms and alkenyl and alkynyl of from 2 to about 5 carbon atoms.

6. The compound of claim 5 wherein Z is alkyl of from 1 to about 5 carbon atoms.

7. The compound of claim 1 wherein Z is aralkyl of phenyl substituted alkyl where the alkyl group contains from 1 to about 5 carbon atoms.

8. The compound of claim 1 wherein X is halogen.

9. The compound of claim 1 wherein X is an aliphatic radical selected from the group consisting of alkyl of from 1 to about 5 carbon atoms and alkenyl of from 2 to about 5 carbon atoms.

10. The compound of claim 1 wherein it is ethyl N-3,4-dichlorophenyl-N-hydroxy-carbamate.

11. The compound of claim 1 wherein it is ethyl N-4-chlorophenyl-N-hydroxy-carbamate.

12. The compound of claim 1 wherein it is ethyl N-3-chloro-4-methylphenyl-N-hydroxy-carbamate.

13. The compound of claim 1 wherein it is ethyl N-3-nitrophenyl-N-hydroxy-carbamate.

14. The compound of claim 1 wherein it is ethyl N-3,4-dimethylphenyl-N-hydroxy-carbamate.

15. The compound of claim 1 wherein it is ethyl N-2,6-dimethylphenyl-N-hydroxy-carbamate.

16. The compound of claim 1 wherein it is ethyl N-3-nitrophenyl-N-carbamoyloxy-carbamate.

17. The compound of claim 1 wherein it is benzyl N-4-chlorophenyl-N-methoxy-carbamate.

18. The compound of claim 1 wherein it is benzyl N-4-chlorophenyl-N-hydroxy-carbamate.

References Cited
UNITED STATES PATENTS
3,308,018   3/1967   Gier et al. _____ 260—471

LORRAINE A. WEINBERGER, Primary Examiner
L. A. THAXTON, Assistant Examiner

U.S. Cl. X.R.
71—111; 260—479, 577; 424—309